United States Patent [19]

Frushour et al.

[11] 3,800,517

[45] Apr. 2, 1974

[54] DRAFT TONGUE AND POWER TAKE-OFF COUPLING FOR PEANUT COMBINES

[75] Inventors: George Victor Frushour; Marvin Lee Nafziger, both of Albany, Ga.

[73] Assignee: Lilliston Corporation, Albany, Ga.

[22] Filed: Feb. 12, 1973

[21] Appl. No.: 331,638

[52] U.S. Cl. ............... 56/208, 56/10.2, 56/130, 56/364
[51] Int. Cl. ............... A01d 67/00, A01d 89/00
[58] Field of Search .......... 56/208, 364, 10.1, 10.2, 56/130, 13.5

[56] References Cited
UNITED STATES PATENTS

| | | | |
|---|---|---|---|
| 2,822,655 | 2/1958 | Sutherland | 56/208 |
| 3,236,035 | 2/1966 | Hamachek | 56/10.2 |
| 3,408,802 | 11/1968 | Slates et al. | 56/364 |
| 3,545,185 | 12/1970 | Whitfield et al. | 56/364 |
| 3,678,667 | 7/1972 | Long | 56/130 |

*Primary Examiner*—Russell R. Kinsey
*Attorney, Agent, or Firm*—Newton, Hopkins & Ormsby

[57] ABSTRACT

The draft tongue of a peanut combine carries a gear box adapted to be connected to the power take-off of a tractor and is connected to the tractor drawbar in such a way that the forward end of the tongue operates in a fixed vertical position in relation to the ground. The tongue is connected to the frame of the combine by transversely aligned horizontal bushings through one of which the output shaft of the gear box projects axially. Push-pull cylinders effect pivotal movement of the combine relative to the tongue to raise and lower the pick-up head of the combine relative to the ground surface.

7 Claims, 3 Drawing Figures

3,800,517
PATENTED APR 2 1974
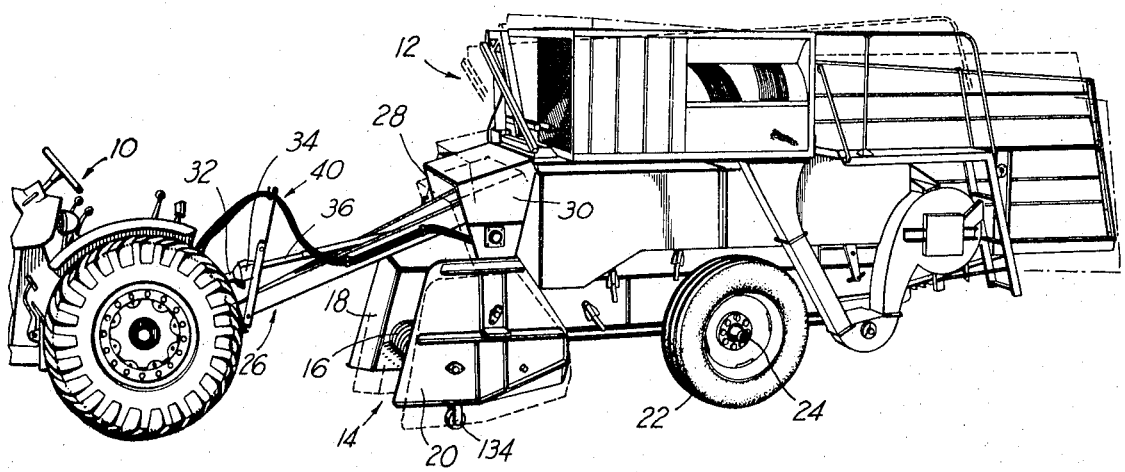
FIG 1
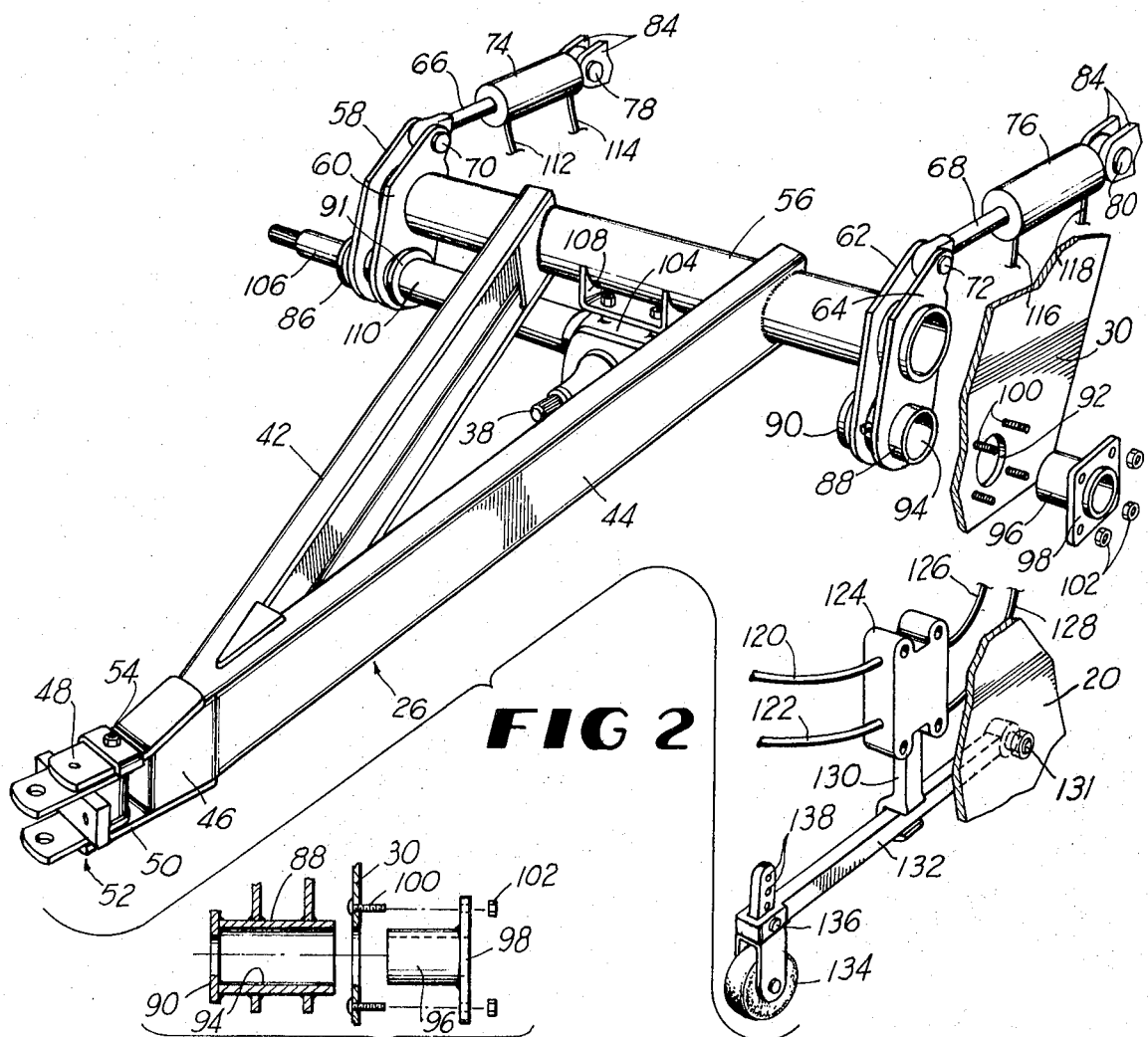
FIG 2
FIG 3

DRAFT TONGUE AND POWER TAKE-OFF COUPLING FOR PEANUT COMBINES

BACKGROUND OF THE INVENTION

Agricultural machines such as a peanut combine have a crop pick-up head which must be controlled as to vertical position in order to effect the proper action and these machines may also include other instrumentalities which require power drive from the power take-off of the tractor to which they are attached. If conventional hydraulic hitches such as two- or three-point tractor hitches are employed to maintain the proper height of the pick-up head, the angle in a vertical plane made by the coupling shaft which extends from the tractor power take-off to the drive coupling on the machine varies in accord with such height adjustment. These changes in angularity of the coupling shaft impose undue strain on the universal joints employed and may cause premature failure thereof and are, moreover, wasteful of power.

BRIEF SUMMARY OF THE INVENTION

Briefly stated, the present invention is directed to an arrangement wherein the pick-up head or similar device of an agricultural machine may be raised and lowered in relation to the tractor towing the machine with a minimum change in the vertical position of the drive coupling means with respect to the power take-off shaft of the tractor and with a minimum change in the alignment or position of the output shaft of the drive coupling means with respect to any shaft or shafts of the machine to which it may be connected.

In general, the invention involves a draft tongue assembly connected at its forward end to the tractor drawbar. The aft end of the tongue carries a drive coupling means having an input path maintained at a selected height relative to the tractor power take-off shaft, and is pivotally connected to the forward end of the agricultural machine being powered. This pivotal connection is about a transverse horizontal axis and when effected allows the machine to rock about the axis of its wheels and thereby maintain the desired height of the pick-up head. Power means is provided to effect such pivotal movement and may be controlled by the operator or by means of a ground sensor means. At the same time, the horizontal transverse output shaft of the drive coupling means is arranged coaxial with the transverse pivot axis so as to remain in alignment and correct position with elements driven thereby, and this output shaft passes through the hollow bearing means used to establish the transverse pivot axis.

BRIEF DESCRIPTION OF THE DRAWINGS

FIG. 1 is a perspective view illustrating a peanut combine attached in towed relation behind a tractor and illustrating the draft tongue attachment according to the present invention;

FIG. 2 is a perspective view with parts broken away illustrating an embodiment of the present invention; and FIG. 3 is an exploded sectional view taken through one of the pivot connections between the draft tongue and body.

DETAILED DESCRIPTION OF THE INVENTION

In FIG. 1, the tractor is indicated generally by the reference character 10 and is operatively disposed in towing relationship to the peanut combine indicated generally by the reference character 12. At the forward end of the body of the peanut harvester 12 a pick-up head assembly 14 is disposed in rigid relationship thereto and includes a power-driven sweeper adapted to gather the peanut vines which have been windrowed for drying. The side plates 18 and 20 of the pick-up head guide the dried vines with peanuts clinging to them into the separating mechanism of the harvester, not shown.

The body of the machine is supported by a pair of wheels one of which is indicated by the reference character 22 disposed at the opposite ends of a common axle 24 so that the machine is capable of rocking about the axis of the wheels correspondingly to raise and lower the pick-up head 14 as is indicated by the full and dashed lines in FIG. 1.

The machine 12 is attached to the tractor 10 by means of the draft tongue arrangement indicated generally by the reference character 26 and extends from a point of connection to the tractor drawbar which is made such that the draft tongue assembly 26 is permitted little or no swinging movement in the vertical plane, albeit that the draft tongue arrangement 26 may be swung laterally about a vertical pivot axis as is conventional. The draft tongue assembly 26 projects rearwardly from the drawbar and at its rearward end is disposed between the vertical side plates 28 and 30 which form a rigid and integral part of the body of the machine 12. The tractor is provided with the usual power take-off shaft 32 which is connected by means of a universal joint in the region 34 to the rearwardly extending telescopic drive coupling the shaft 35 which extends, for connection through a further universal joint to the input shaft 38 described more particularly with reference to FIG. 2. To complete the power connection between the tractor and the machine 12 flexible hydraulic pressure lines 40 are coupled at appropriate points to the tractor and are extended rearwardly to the machine 12 for connection as hereinafter more particularly described in conjunction with FIG. 2.

The draft tongue arrangement is shown in detail in FIG. 2 and will be seen to consist of a rearwardly extending tongue having divergent arm portions 42 and 44 joined at their forward ends to define the nose 46 rigidly carrying tongue plates 48 and 50 which vertically straddle an adaptor device indicated generally by the reference character 52 which itself is coupled to the drawbar of the tractor. Suffice it to say that the interconnection to the tractor drawbar is such that the draft tongue assembly 26, while permitted of lateral swinging motions about the axis of the clevis joint bolt 54, nevertheless is permitted no or relatively no swinging movement in the vertical plane. Thus, the forward end of the draft tongue assembly 26 remains at the same height at all times relative to the tractor assembly.

The rearward end of the draft bar assembly 26 incorporates a horizontal transverse frame member 56 preferably in the form of a tube as shown and disposed at the opposite ends thereof are pairs of frame arms 58, 60 and 62, 64. These plate-like arms are provided with openings receiving the opposite ends of the frame tube 56 and are welded or otherwise rigidly affixed thereto in slightly spaced apart relationship at each end of the tube 56, substantially as is shown. The upper extremities of these frame arms define ears between which the free ends of the pistons 66 and 68 are received and which are pivotally coupled therto as by the pins 70 and 72. These pistons form part of the piston and cylinder assemblies which are operated by hydraulic fluid from the tractor, the cylinders 74 and 76 being pivotally coupled by pins 78 and 80 between pairs of ears 82, 84 rigidly affixed to the body or frame of the machine. The lower extremities of the frame arms are provided with openings receiving hollow bushing members 86 and 88 and which bushing members are rigidly affixed to the frame arms. As will be seen in FIGS. 2 and 3, the side plate 30 is provided with an opening 92 which is of the same size as or slightly larger than the bore 94 of the bushing 88 and which is adapted to pass the hollow journal member 96 therethrough which projects into and is rotatably received by the bushing 88. A thrust washer 90 is fixed to the inner end of the bushing 88 (FIG. 3) and a similar washer 91 is provided on the inner end of the bushing 86. The inner end of the journal member 96 projects into close proximity to the washer 90 and a similar relation at the opposite side of the machine provides for just sufficient lateral clearance to prevent binding.

A retainer plate 98 is provided on the member 96 and a series of bolts 100 projecting through the plate 30 are received through openings in this retainer plate whereby the nuts 102 may be utilized securely to fasten the assembly in place. As noted, a similar arrangement prevails at the opposite side of the machine for the bushing 86 and the associated side plate 28.

Mounted in underslung relation below the frame tube 56 is a gear box 104 which journals the aforementioned input shaft 38 and which is provided internally with a set of bevel gears driving the output shaft 106 from the input shaft 38. The underside of the frame tube 56 is provided with a suitable saddle or seat arrangement 108 by means of which the gear box 104 is removably secured thereto and it will be appreciated that the disposition of this seat and corresponding disposition of the gear box 104 is such that the input shaft 38 is angled within a vertical plane such that it requires a minimum deflection through its universal joint coupling to the shaft 36 to align with the power take-off shaft of the tractor. Thus, this universal joint will not be subjected to the type of abuses associated with transferring power at drastic angles.

A housing in the form of a tube 110 projects laterally from the gear box 104 and concentrically journals or contains the output shaft 106. The housing 110 and, correspondingly the output shaft 106, extend through and are aligned with the hollow bearing means formed by the inner bore of the hollow journal member 96.

It will be appreciated from the above that the draft tongue arrangement 26 remains vertically fixed with respect to the tractor and so may swing up and down in a vertical plane correspondingly with the tractor whereas, at the same time, the cylinders 74 and 76 may be operated to counteract such corresponding rocking motion of the vehicle 12 which would otherwise occur or which might be occasioned by movements of the machine 12 itself. Each cylinder 74 and 76 is provided with a pair of fluid pressure lines 112, 114 and 116, 118. These lines may be connected to a control valve assembly on the tractor so that the operator may control movements of the pistons 66 and 68 as desired. In this case, the appropriate lines are incorporated in the set of lines 40 extending rearwardly from the tractor.

If automatic header height control is desired, the control valve assembly may be located on the combine as shown at 124. In this instance, the lines 40 from the tractor include, as is shown in the lower right-hand section of FIG. 2, a pressure line 120 and a return line 122 and these are coupled through the intermediary of the spool valve arrangement 124 selectively to the lines 126 and 128 as shown. The line 126 is connected to both of the inlet lines 112 and 116 of the cylinders 74 and 76 and the line 128 is coupled to both of the lines 114 and 118 of the cylinders. The spool valve includes an actuator 130 which is effective, upon axial movement thereof either to connect the line 120 to the line 126 and the line 122 to the line 128 or vice versa correspondingly to effect retraction and extension of the piston cylinder arrangements controlling the relative pivotal motion between the vehicle 12 and the draft tongue assembly 26.

The side plate 20 of the head 14 pivotally carries, as by a pin 131 the forwardly extending arm 132 which is connected to the actuator 130 and which carries at its forward free end a sensor wheel 134. The sensor wheel 134 is pinned as at 136 to the arm 132 through a selected one of the various spaced openings 138 therein, thereby to control the effective height at which the pick-up head 14 will ride with relation to the ground surface. The sensor assembly of course detects the presence of the ground and operates the valve assembly 124 constantly to maintain the pick-up head 14 in predetermined position relative to the ground surface by virtue of effecting the proper pivotal motion between the vehicle 12 and the draft tongue arrangement 26.

What is claimed is:

1. In combination with a peanut combine or like machine having an elongate body provided with a crop pick-up head at its forward end which requires drive from the power take-off of an associated tractor, support wheels for the body to allow the pick-up head to be adjusted in a vertical plane about the axis of the support wheels; a draft tongue assembly projecting forwardly from said body and adapted to be connected to the associated tractor in such fashion as allows substantially no movement between the draft tongue assembly and the associated tractor in a vertical plane; pivot connections means between said draft tongue assembly and said body for establishing a horizontal transverse pivot axis connection therebetween to allow vertical movement of said pick-up head about said axis of the support wheels; drive coupling means on said draft tongue assembly having an input shaft disposed at a selected height alignment with the power take-off of the associated tractor and having an output shaft coaxial with said transverse pivot axis between the draft tongue assembly and said body whereby vertical movement of said pick-up head has minimum effect on the height alignment of said input path nor does it affect the alignment of said output shaft relative to said body; and power means connecting said body to said draft tongue assembly for vertically adjusting said pick-up head.

2. In the combination as defined in claim 1 wherein said draft tongue assembly includes a transverse frame member at the rearward end thereof and vertical frame arms at the opposite ends of said transverse frame member, said drive coupling means being mounted on said transverse frame member with said output shaft thereof in parallel offset relation thereto.

3. In the combination as defined in claim 2 including sensing means carried by said pick-up head for controlling said power means to maintain said pick-up head substantially at a selected level above the ground surface.

4. In the combination as defined in claim 1 including sensing means carried by said pick-up head for controlling said power means to maintain said pick-up head substantially at a selected level above the ground surface.

5. In the combination as defined in claim 1 wherein said body includes a pair of spaced, parallel, fore-and-aft extending frame plates at the forward end thereof; said draft tongue assembly including a transverse frame member at the rearward end thereof disposed between said frame plates, vertical frame arms connected to the opposite ends of said frame member in closely spaced relation to respective ones of said frame plates; said pivot connection means being in the form of hollow bearing means interconnecting said frame plates and said frame arms in offset relation to said transverse frame member; said output shaft of the drive coupling means extending through one hollow bearing means to terminate outboard of the corresponding frame plate.

6. In the combination as defined in claim 5 including sensing means carried by said pick-up head for controlling said power means to maintain said pick-up head substantially at a selected level above the ground surface.

7. In the combination as defined in claim 1 wherein said body includes a pair of spaced, parallel, fore-and-aft extending frame plates at the forward end thereof; said draft tongue assembly including a transverse frame member at the rearward end thereof disposed between said frame plates, vertical frame arms connected to the opposite ends of said frame member in closely spaced relation to respective ones of said frame plates; said pivot connection means being in the form of hollow bearing means interconnecting said frame plates and said frame arms in offset relation to said transverse frame member; said output shaft of the drive coupling means extending through one hollow bearing means to terminate outboard of the corresponding frame plate; said power means being connected to said frame arms remote from said hollow bearing means.

* * * * *